Sept. 29, 1964  H. M. BECK  3,151,312
ELECTRONIC REAL TIME STATISTICAL ANALYZER
Filed Feb. 27, 1962  7 Sheets-Sheet 4

INVENTOR
HUGO M. BECK
ATTORNEYS

United States Patent Office                                3,151,312
                                                                   Patented Sept. 29, 1964

1                                                                 2 crete approach in time and amplitude should serve as a
                         3,151,312                            basis for the analyzer and that a binary stream of infor-
       ELECTRONIC REAL TIME STATISTICAL                       mation arriving at a fixed rate or at least a rate synchro-
                        ANALYZER                              nous with some known function of time would be em-
Hugo M. Beck, Oxon Hill, Md., assignor to the United        5 ployed. The problem was to examine some measures of
  States of America as represented by the Secretary of       randomness of the time series, set up control limits for
  the Navy                                                   each type of measure, make statistical measurements on
          Filed Feb. 27, 1962, Ser. No. 176,161              the time series and decide on the bases of these measure-
             5 Claims. (Cl. 340—172.5)                       ments and limits whether or not useful information is
   (Granted under Title 35, U.S. Code (1952), sec. 266)    10 present in the time series.
                                                                Accordingly it is an object of this invention to provide
   The invention described herein may be manufactured        a new and improved means for making statistical meas-
and used by or for the Government of the United States of    urements of a time series of information in real time.
America for governmental purposes without the payment           Another object of this invention is to concern itself
of any royalties thereon or therefor.                        mainly with binary streams of information and the analy-
   This invention relates to a statistical data processing 15 sis measures corresponding to auto-correlation, cross-
system and a method for analyzing time series of infor-      correlation, distributions of pulse trains and patterns, and
mation. More particularly this invention involves an         the Bernaulli distribution.
electronic statistical signal analyzer capable of operating     It is a further object of this invention to select various
on a time series of arbitrary information by statistical     information processing programs, to select the total sam-
concepts and continuously displaying the results of the    20 ple size for each program and to select any other sampling
operation on a visual display.                               parameters that are appropriate for the program selected,
   In the past the problem of communicating information      while continuously displaying the results of these selec-
in a system generally only concerned itself in terms of a    tions on a visual display.
serial analysis of sinusoids or pulse functions. However,       Yet another object of this invention is to provide cross
such systems did not readily lend themselves to the wide   25 checks for each analyzing program selected and also pro-
variety of available information and the randomness that     viding available checks for testing the various related
is experienced in many applications of communicating         circuits for marginal operation.
such information. Today one can scarcely escape the             Still another object of this invention is to provide
statistical problems that arise in connection with known     adequate means for making statistical measurements in
observations of information which have been influenced     30 real time of an information time series corresponding to
by uncontrolled fluctuating conditions, such as in the trans- certain specified probability distribution, to automatize
mission of electromagnetic waves in the atmosphere or        the routine and repetitive parts of the statistical analysis
electrical pulses in the nervous system or noise in an elec- of the time series and to expedite decisions relating to a
trical circuit. The outstanding characteristic of each ob- 35 time series by measurements made of a portion of such
servation is its random motion with time.                    time series.
   More recently, systems have been developed that are          It is still another object of this invention to make binary
capable of appreciating the random quality of informa-       decisions based on statistical observations and to make
tion by considering it in terms of statistics and probability these decisions by choosing six different programs as a
and as such the field of science has become increasingly   40 means of processing input information into usable statis-
aware of the use of statistical analysis in electronics, geo- tical form, for comparison with the known appropriate
physics, weather control, radar and other fields. Further,   probability distributions.
it has only been in recent years that such fields as auto-      It is still a further object of this invention to analyze
mation control, various factors of human behavior and        an information series in real time from telemetering sys-
noise disturbances in information transfer, have been        tems, physical systems and communication systems in-
studied extensively as a statistical phenomena, character- 45 cluding both audio and visual, without the need for large
ized as such, and treated as a random process.               scale storage systems, and to provide for error detecting
   In communication systems in particular, the problem       and correcting under actual operating conditions.
often arises as to the most effective means of differentiat-    While this invention is devised for synchronous parallel
ing in an information signal between noise disturbance       operation at communication information rates from any
and the data deeply imbedded within the disturbance.       50 constant-rate real time signal source or from a variable
Previously, it was conventional to analyze the information   rate source with available rate information, due to its real
by the method of serially deriving the auto-correlation      time approach the necessity is no longer present for re-
and cross-correlation function for the time varying infor-   cording and storing equipment such as previously required
mation signal; however, such methods have been unrelia-      in prior serial auto-correlation and cross-correlation point
ble, expensive, and processing speed has been greatly      55 by point techniques.
curtailed, even when high speed recording equipment has         The foregoing and other objects, novel features and ad-
been employed. Other processing methods for operating        vantages of the invention will become more fully apparent
upon time series of information, such as in a time per       from the following description when read in connection
unit event operation, have been limited to non-statistical   with the accompanying drawings wherein:
techniques, due, largely to the human factor that was
     FIG. 1 is a schematic block diagram of a statistical
necessarily involved in such analyzing. But the largest
                                                             analyzer in accordance with the principles of this inven-
difficulty has been the incapability of processing informa-  tion;
tion in real time and analyzing it correctly.
                                                                FIG. 2 is a block diagram of an auto-correlation pro-
   In search for a more efficient method and system of
                                                           65 gram as instrumentated for the statistical analyzer;
analyzing information and to perform the analysis in
real time, a set of analysis operations, such as the auto-      FIG. 3 is a block diagram of another instrumentation
correlation function, were instrumented as programs for      for the auto-correlation program;
a statistical analyzer. The analysis operations correspond      FIG. 4 is a block diagram of a cross-correlation pro-
to measurements, which result in output signals consisting   gram as instrumentated for the statistical analyzer;
of statistical distributions which in turn are compared    70   FIG. 5 is a block diagram of a time per unit event
with appropriate corresponding probability distributions.    program as instrumentated for this invention;
To supplement these operations it was decided that a dis- FIG. 6 is a block diagram of an events per unit time program as instrumentated for this invention;

Figure 1:
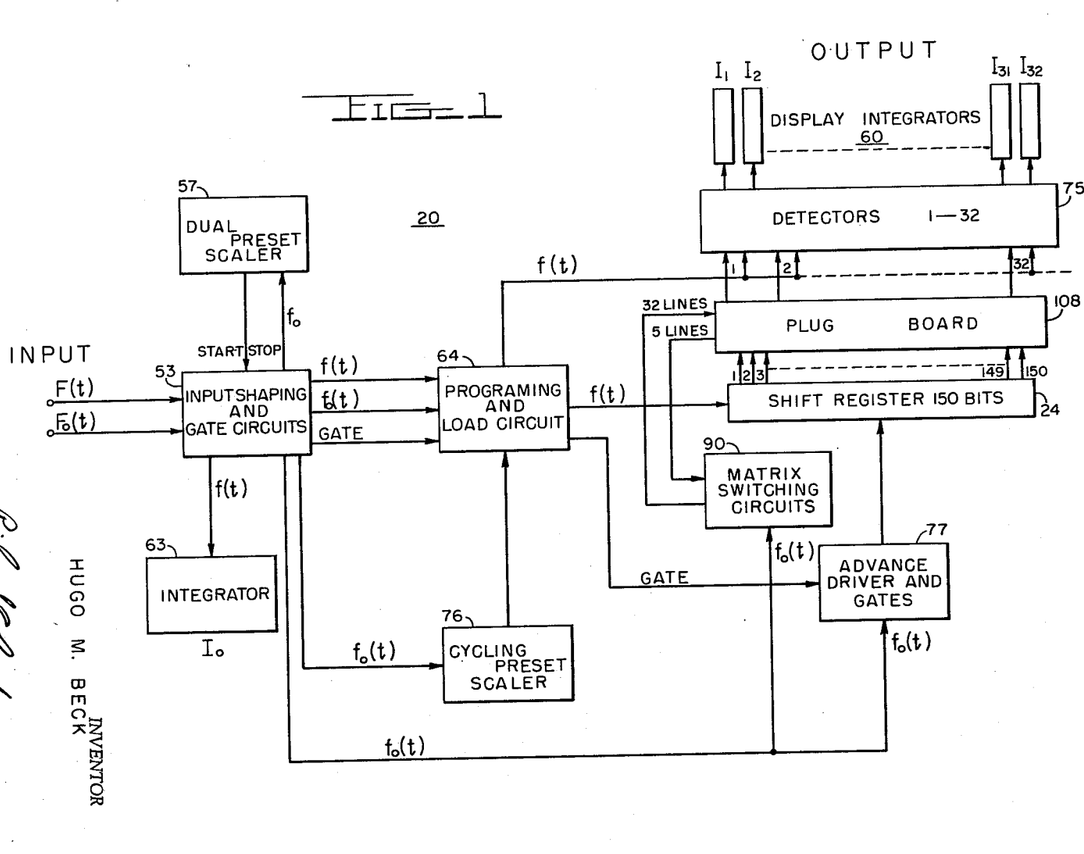

Referring now to the drawings in detail and in particular to FIG. 1, a suitable statistical analyzer for observing a time series of information, making various observations in regard to the time series and displaying the statistical distributions of the time series in accordance with the observations, is diagrammatically indicated at 20. The decisions made while performing these various observations of the time series, may be thought of as binary decisions made on the basis of the observed measurements. In order to observe the time series, six different statistical programs were chosen as a means of processing the time series of input information, $f(t)$, into usable form for comparison with the known probability distribution associated with a particular statistical program. Any one of the statistical programs for analyzing $f(t)$ can be performed by the statistical analyzer 20. The analyzer 20 is capable of performing statistical measurements on the time series $f(t)$ in real time by setting up a particular statistical processing program, operating on the time series in accordance with the program for a time period T and continuously displaying the results of the operations on a visual display throughout the time period T.

Program 1

One approach to analyzing a time series is with the help of the correlation function and the methods of statistical dynamics. In auto-correlation techniques, the function becomes a measure of the mutual connection between two similar values or marks of a time series displaced in T and dependent upon the variable $\tau$.

In a random function the smaller the time consideration the greater the mutual connection between the two values becomes. Since the auto-correlation function of a random time series tends to produce a constant value as the displacement of the randomness increases to comparatively large value whereas that of a systematic function would persist as a periodic function; auto-correlation is an effective method for detecting a periodic signal in a time series of random quality. The first program, which is shown in FIG. 2 is concerned with a finite unnormalized auto-correlation of the binary time series $f(t)$, the actual operation produced being $$Q(\tau) = \int_{t=0}^{T} f(t)f(t+\tau)$$

where $\tau$ is the discrete delay, $\tau=0, 1, 2$.

Figure 2:
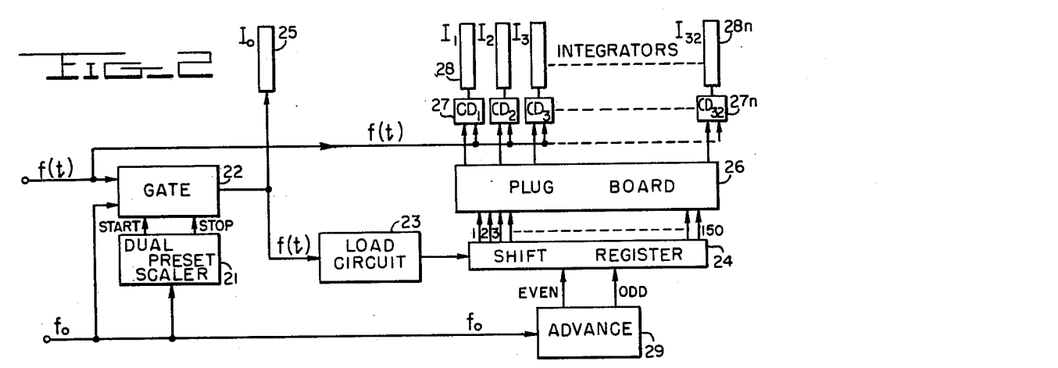

In program 1 shown in FIG. 2, a time series of information $f(t)$ is sent down a shift register, delaying the time series in discrete steps of time $\tau$. The time series $f(t)$ is then compared with its delayed versions $f(t+\tau)$ and the comparison recorded in parallel in corresponding integrators.

In FIG. 2 a time series $f(t)$ and a clock rate $f_0(t)$ arrive at the analyzer 20 set up for program 1. Here the clock rate actuates a dual scaler 21 preset for sample size T, which generates two command pulses, start and stop and thereby determines the period for sampling the time series $f(t)$. When scaler 21 is actuated and a start pulse generated, gate 22 sends the time series $f(t)$ to a load circuit 23 which provides the coupling or impedance matching for connecting the signal to shift register 24. Integrator 25 counts the total number of marks in the time series, that have occurred during the sampling period predetermined by scaler 21. Shift register 24 generates delayed versions of $f(t)$ for the sampling period T. The layout of the program is such that any 32 delays of a 150-bit magnetic core shift register may be chosen by means of a plugboard 26. The plugboard 26 provides for ease and flexibility in changing the mode of operation for shift register 25 and in connecting the correct shift register outputs to available detectors. The 32 delay signals are then connected to 32 coincidence detectors 27 to 27n and through the detectors to the 32 integrators 28 to 28n, which in this instant are 6-place decimal scalers. The other terminal of all the coincidence detectors is common and connected to $f(t)$ as it arrives at the input. The clock pulse $f_0$ for this program is assumed to be synchronous with the information time series pulses $f(t)$ and they do not have to arrive at a regular rate. The clock pulse $f_0$ generates an even-odd relationship in advance driver 29 which switches the cores in shift register 24.

In operation, the input signal $f(t)$ is compared in the detectors with delayed versions of $f(t)$ and whenever a detector coincidence occurs, a pulse is added to the corresponding integrator. It should be appreciated that if $f(t)$ should correspond to multiple delayed versions, the corresponding integrators will all simultaneously register.

Program 2

Figure 3:
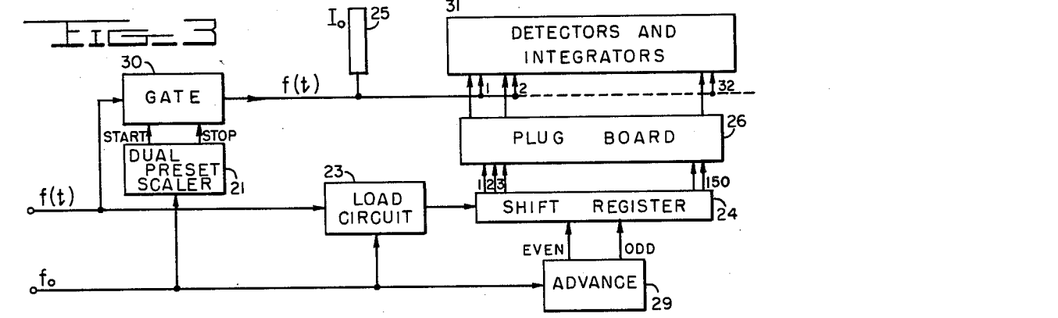

Program 2 shown in FIG. 3 also provides for auto-correlation and differs from program 1 in that the information signal $f(t)$ is fed directly to the shift register and is not gated with the sampling interval as is necessary in the auto-correlation operation of program 1. In program 1, only the shift register is gated with the sampling interval thereby guaranteeing that the shift register is empty at the beginning of the time period T when the time series is being sampled, and previous unwanted information is ignored in the ensuing correlation. In program 2, only the detectors are gated, thereby guaranteeing that the information in the time series immediately preceding the beginning of time period T is in the shift register when period T begins, and such information can accordingly, be used in the ensuing correlation.

As shown in FIG. 3, a time series signal $f(t)$ and a clock rate $f_0$ arrive at the analyzer 20 which has been preset for program 2. Similar to program 1, the clock rate actuates the dual preset scaler, setting up the sampling period T and triggering gate 30 whenever a start pulse is generated. This causes the time series $f(t)$ to be sent directly to the detectors. During the total time in which the time series $f(t)$ is impressed at the input, it is being coupled by load circuit 23 to shift register 24. At the same time the clock rate $f_0$ is triggering advance driver 29 so as to produce even-odd pulses for advancing the time series information along shift register 24. Integrator 25 counts the total number of marks in the sampling period.

As before in program 1, whenever a coincidence occurs between $f(t)$ that is gating the detectors and a delayed version of $f(t)$ from the shift register 24, a pulse is registered in the appropriate integrator or integrators. However, in this program the input signal $f(t)$ is gating the detectors and immediately being compared with information already in the shift register. It should be pointed out that programs 1 and 2 are identical for processing the main body of information passing during time T. However program 1 ignores all information prior to time T, and keeps processing information for a short time after the end of time T until the shift register is empty; while program 2 processes information already in the shift register when the processing time T begins, and ignores all information after the termination of time T. When both detectors and the shift register are gated, only information arriving during time T is processed.

It should be appreciated that programs 1 and 2 can be ideally used in short-term correlation communications techniques.

*Program 3*

Figure 4:
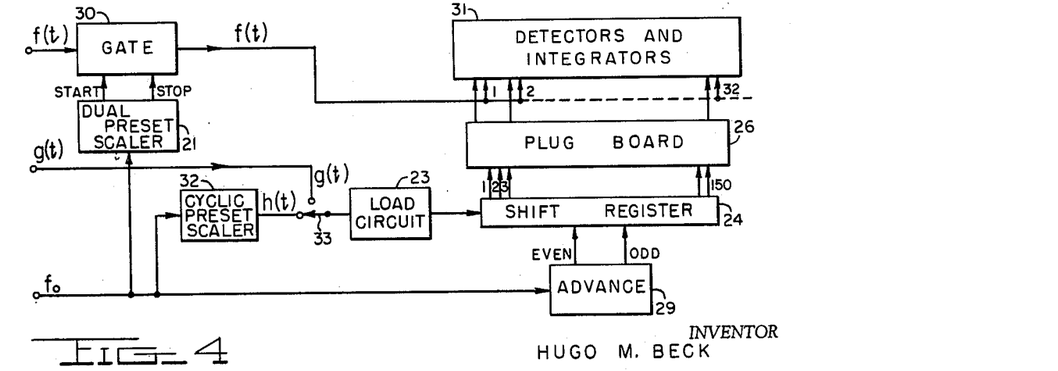

It is frequently desirable to correlate a pair of similar time series which are displaced from each other. For example, when two functions are identical except for their time displacement, the general auto-correlation function obtained in either program 1 or 2 is sufficient but when the functions are independently derived then it becomes necessary to also determine the cross-correlation by comparing one function with delayed versions of the other function. The equipment required, however, to determine the cross-correlation function is different than in auto-correlation and as a result, program 3 was instrumentated. Program 3 shown in FIG. 4 is similar to programs 1 and 2 except that the function in the shift register is an arbitrary function, $h(t)$ or $g(t)$ correlating with $f(t)$ which is gating the detectors. The detectors form the product $f(t) \cdot h(t+\tau)$ or $f(t) \cdot g(t+\tau)$ depending upon which function is correlated with time series $f(t)$.

As shown in FIG. 4 and assuming switch 33 is in the position shown, two time series $f(t)$ and $f(t)$ and a clock rate $f_0$, are impressed at the input of analyzer 20. The clock rate $f_0$ initially actuates the dual preset scaler 21 and when a start pulse is generated, the time series $f(t)$ is gated directly to the detectors 31 as in program 2, FIG. 3. The clock rate $f_0$ while actuating the scaler 21 also actuates a cyclic preset scaler 32 causing a predetermined cyclical output pulse at an arbitrary scaling rate, although the rate is usually some division of the sampling rate by scaler 21. The function $h(t)$ is then connected by switch 33 to load circuit 23 which couples $h(t)$ to the shift register 24. The clock rate $f_0$ is also performing its usual triggering or advance driver 29 in order to advance $h(t)$ through the shift register 24. Now, whenever a delayed version of $h(t)$ corresponds to $f(t)$ a coincidence occurs at the detectors and the appropriate integrator or integrators register the result.

By connecting switch 33 to the input of time series $g(t)$, an independently derived external function can be coupled to shift register 24 and similarly to $h(t)$, delayed versions of $g(t)$ can be compared with time series $f(t)$.

By switching the load circuit 23 so as to receive signals from the cyclic preset scaler 32, periodic components of $f(t)$ can be detected. This program could be used for experiments in comb filter techniques.

It should also be appreciated that in programs 1, 2 and 3 the coincidence detectors may be a more general form of combinational logic, such as anti-coincidence or exclusive OR circuits.

*Program 4*

Figure 5:
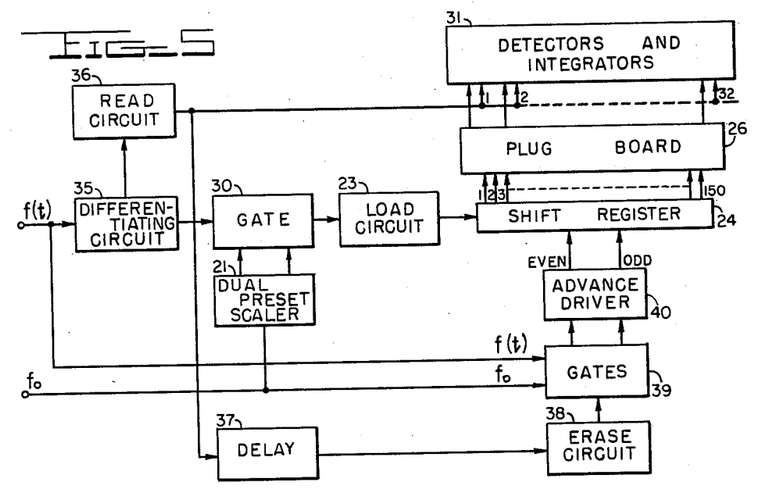

According to accepted statistical techniques, one is often interested in run lengths, say of successes in a game. The purpose of program 4 shown in FIG. 5 is to automatically count the number of success runs of length one, success runs of length two, up to the maximum number of success runs. The number of successes of run length $r$ is again counted up in the $r$th channel and at the end of the observation period the distribution of counts in the various channels will correspond to the statistical distribution of runs in the observation period. Program 4 which can perform this operation, reads and classifies the time per unit event, the event being the length of an isolated pulse group or runs. These groups may be isolated singlets, doublets, etc., up to some maximum value for the sample. The probability that a group will have length $r$ is $$p_r = q^2 p^r$$

where $p$ is the probability of a pulse in a time series, and $q = 1 - p$. If $p_r$ is plotted on semilogarithmic paper against $r$, the resulting curve for a random distribution is a straight line, the slope being a function of $p$. Aberrations from randomness in a sample can show up as deviations from this straight line. In this program, a pulse group of length $r$, selects the $r$th integrator and is recorded therein and is essentially a study of the probability distribution of run lengths whereas the former programs provide merely a comparison operation.

Program 4, as shown in FIG. 5 has a time series $f(t)$ and a clock rate $f_0$ arriving at the input circuits of the program. Clock rate $f_0$ actuates the dual preset scaler 21, which determines the sampling period for the time series $f(t)$ and sends a start pulse to gate 30. As the time series $f(t)$ goes into mark condition, i.e., a pulse group of intervals to be measured comes along, the differentiating circuit 35, differentiates the time series to be studied and sends a pulse that is representative of the leading edge to loading circuit 23 which in turn couples the leading edge pulse of the time series to shift register 24. At the same time $f(t)$ is actuating gate 39 so that clock rate $f_0$ can be coupled to the advance driver 40. So long as $f(t)$ remains in mark condition, gate 39 will send clock rate $f_0$ pulses to the driver 40. Driver 40 advances the leading edge pulse of the time series $f(t)$ through the shift register 24 corresponding to the consecutive intervals in the pulse group of the time series $f(t)$ being observed. When the mark condition ends, i.e., the pulse group of intervals to be measured ends, the differentiating circuit 35 will send a pulse that is representative of the trailing edge of time series $f(t)$ to the read circuit 36, which in turn, sends a read pulse to all the detectors 31 and gates them into a condition for sensing the bit in shift register 24 in which the leading edge pulse is located. As the mark condition ends, gate 39 is closed and the advance driver before stopping, causes the shift register to read out its information. The information is then sent to the gated detectors and 31 the appropriate integrator registers the result. The read pulse from read circuit 36 is also impressed on delay circuit 37, which delays the signal until the shift register has been read out by the detectors and then actuates erase circuit 38. Erase circuit 38 causes advance driver 40 to send simultaneous even-odd pulses to the shift register 24 which clears the register and prepares it to start all over again when time series $f(t)$ again enters mark condition.

In program 4, the number of contiguous pulse groups of length $r$ have been recorded in the $r$th integrator.

*Program 5*

Previously, statistical data showing the spread of the data in terms of events per unit time were mostly performed on an manual basis. In program 5, shown in FIG. 6, a means is provided for measuring a certain number of events, i.e., pulses, for a period of time, classifying the measurements according to size in the appropriate class intervals, selecting the integrators corresponding to the number of events and recording the results.

Figure 6:
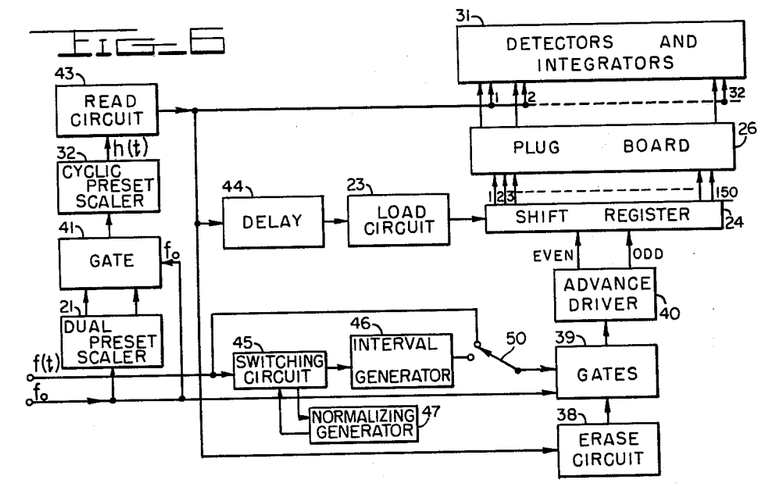

In operation the program counts the number of pulses or marks in a fixed interval of time $T_1$ and repeats the measurement for a sampling period T, where T may be $nT_1$. Here $n$ will be the number of measurements made. The count zero will happen $n_0$ times, the count 1 will happen $n_1$ times, the count $r$ will happen $n_r$ times. It is the number of measurements made, $n$, that are displayed by the integrators. This program gives, essentially, a measure of the energy distribution of non-overlapping samples of a time series $f(t)$. For example, one may wish to measure the distribution of marks in 100 samples of size 10. The main gate 41 in FIG. 6 is preset to remain open $100 \times 10 = 1000$ clock pulses and the cyclic preset scale is set at 10. When the main gate 41 closes, there will be 100 readings of the subsample of size 10 in the register 24. These individual subsamples are associated with the Bernoulli distribution $$P_r = \binom{m}{r} p^r q^{m-r}$$

where P is the probability of a pulse in the time series $f(t)$, $m$ is the subsample size, $r$ is the number of mark occurrences and $q=1-p$.

A given sample may be plotted on standard plots of the binomial probability density curve and compared directly with it for immediate interpretation of consistent aberrations, or the data may be retained for standard tests of randomness.

As can be seen in FIG. 6 the time series $f(t)$ and clock rate $f_0$ are both impressed at the input of the analyzer 20. The clock rate actuates the dual preset scaler 21 which generates a start pulse, triggering gate 41. Gate 41 when triggered passes clock rate $f_0$ to the cyclic preset scaler 32 which generates an output pulse $h(t)$ of some predetermined time division or subsample of clock rate $f_0$. Scaler 32 sends $h(t)$ to read circuit 43 causing this circuit to generate a read pulse and gating detectors 31. In this program, program 5, the read pulse is associated with the clock rate $f_0$ whereas in the previous program, program 4, the read pulse is associated with the time series $f(t)$.

The time series $f(t)$ is impressed directly on gate 39 by switch 50 which allows clock rate $f_0$ to actuate advance driver 40. At the same time read gate pulses are being sent to detectors 31, a pulse signal is being impressed on delay 44. The delayed signal is then coupled to shift register 24 by load circuit 23. Thus one bit in the shift register is being loaded by a pulse signal which is a function of the cyclical scaler 32 which is a predetermined function of the clock rate $f_0$. Due to the actuating of gate 39 by time series $f(t)$, the loaded bit is advanced through the shift register by driver 40 as a function of $f(t)$ until the cyclic preset scaler 32 again triggers the read circuit 43, which will gate the detectors 31. The loaded bit is then read out and recorded by the appropriate integrator. The pulse delayed by delay 44 is then fed into shift register 24 by circuit 23 and the process repeated. The same pulse that gates the detector 31 is also employed to actuate erase circuit 38 which will in turn cause the advance driver 40 to generate both even-odd pulses and erase any undesirable information in the shift register before delayed version of the read pulses is loaded into the shift register 24.

If switch 50 is set so as to connect the output of class interval generator 46, the class interval of integration can be widened. In this application, the time series $f(t)$ is impressed on switching circuit 45 which feeds the time series $f(t)$ to normalizing generator 47. Normalizing generator 47 subtracts a constant number of pulses occurring in time series $f(t)$ which in effect will shift the center point of the output display. Should the constant number subtracted by generator 47 be exceeded, then the switching circuit feeds the remaining portion of the time series $f(t)$ to the class interval generator 46 which performs a scaling function by causing a certain range of mark counts to be recorded in a given selected channel. In effect generator 46 is operating as a cyclical preset scaler. Thus, the overall results registered by the integrator or integrators now becomes not only a function of scaler 32 providing a class interval of one, but now also a function of class interval circuit 46 and normalizing circuit 47 which provide appropriate circuitry for many other class intervals.

This program has also found itself suitable for studies in discrete short term integration communications methods.

*Program 6*

Vector pattern counting was usually previously performed by a mechanical teletype sequential selector but as a result the speed of operation was limited to teletype speeds, seriously limiting the type and number of signals that could be processed in this manner. Program 6 shown in FIG. 7 performs a vector pattern count in the analysis of a time series $f(t)$ by selecting five adjacent or five noncontiguous bits from along the shift register 24 by the plugboard 26 and fed to matrix circuits 48. These five bits determine a five-place binary number from 0 to 31 and these numbers are translated by a matrix circuit to 32 outputs. One and only one output line of the matrix circuit 48, is selected for each of the possible 5 bit combinations on the matrix input. This selected line selects the appropriate detector and this selection is recorded in the corresponding integrator at read time.

The five-place binary bits may also be thought of as numbers, derived from a sampling process on a continuous time series, and the distribution measured, would then be a distribution of amplitudes.

Figure 7:
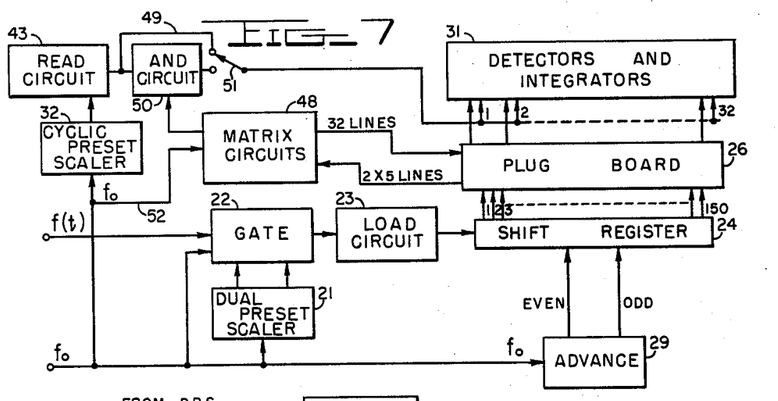
FIG. 7 is a block diagram of a pattern counting program as instrumentated for this invention.

In operation, program 6 initially receives a time series $f(t)$ and clock rate $f_0$. The clock rate actuates the dual preset scaler as in program 2 and allows gate 22 to pass the time series $f(t)$ to circuit 23 in order to load the shift register 24 with information. At the same time $f_0$ is triggering the cyclic preset scaler 32, which in turn triggers read circuit 43 at the same divisional rate as the clock rate $f_0$. With switch 51 in the position as shown in FIG. 7, whenever read circuit 43 is triggered, it sends a read pulse to gate detectors 31.

In this program, program 6, five bits, delayed versions of time series $f(t)$, from shift register 24 are sent to the matrix circuits 48, which translates the five bit information into 32 outputs, which in turn gates the 32 detectors. Thus, whenever a read pulse from circuit 43 gates the detectors 31 in coincidence with the gating signals provided by the matrix translator 48, the detectors read out the matrix selection determined by the 5 bit setting. The lead 52 connecting the clock rate $f_0$ to the matrix circuits is provided so that the appropriate matrix circuits can be cleared every time a clock rate $f_0$ occurs.

If switch 51 is moved so as to connect to the output of AND circuit 50 it is also possible to pick off five more bits from the shift register 24 and set up another matrix based on these five bits which will translate the information into a single output pulse. This output pulse can then be used to gate the read pulses to actuate the detectors as determined by the five bit setting.

In program 6, a binary set of bits, a vector determined by a time series $f(t)$ and its delayed versions, determines 1 of 32 possible matrix translator outputs, which are displayed by corresponding detectors and integrators at a time determined by a function of the clock rate $f_0$.

This program could also be suitable for use as a component in studies of dynamic coding techniques.

*Analyzer*

Figure 8:
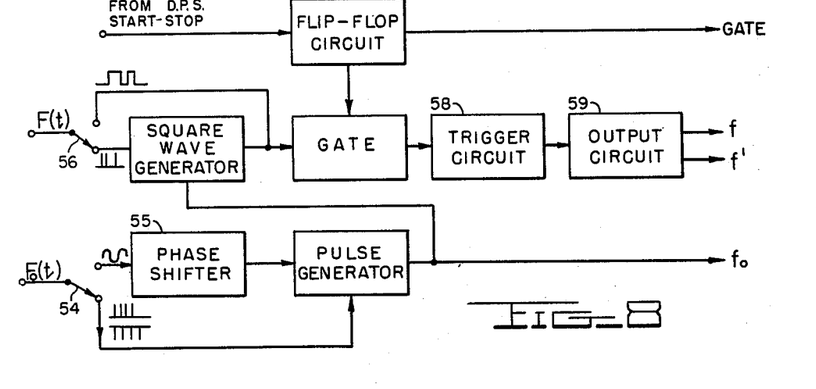
FIG. 8 is a block diagram of the input shaping and gating circuits.

The statistical analyzer 20 capable of performing the statistical measurements, corresponding to programs 1 to 6, in real time, is shown in FIG. 1. The time series $F(t)$ under consideration can be in the form of either pulses or square waves while the clock rate $F_0(t)$ can be in the form of either pulses or a sine wave. Both the time series and clock rate are applied to an input shaping and gating circuit 53 which provides for reshaping and retiming of the respective input signals, while providing the master time for the entire system. While the input clock rate can be in the form of either a sine or pulse wave, it also may be either positive or negative by switch 54. As seen in FIG. 8, provisions are made, circuit 55, for shifting the phase of the input clock rate. The clock rate output is in the form of two out-of-phase positive pulses (even and odd), which are used in the system for sampling, for operating the advance driver circuits and for operating the interval timing equipment such as the cyclic preset scaler in program 6.

The shaping circuit 53 also has switch 56 which will accept time series $F(t)$ in the form of pulses or square waves, positive or negative. The information is then gated on and off (start-stop) for a sampling period T, under the control of a dual preset scaler 57 and is converted into a standardized square wave $f(t)$ by means of a Schmitt trigger circuit 58, since the internal operation of the system as shown is based on a square wave. An output circuit 59 comprising an amplifier or a D.-C. coupled flip-flop is employed in order to provide double rank logic outputs from a single rank output from trigger circuit 58. The double rank logic provides a signal $f$ and its complemented signal $f'$.

The analyzer 20 shown in FIG. 1 is designed for 32-channel operation and the processed information is made visually available by 32 integrators 60. It should be appreciated that more channels of operation could be used and different visual display equipment could be employed for integrators 60.

Figure 13:
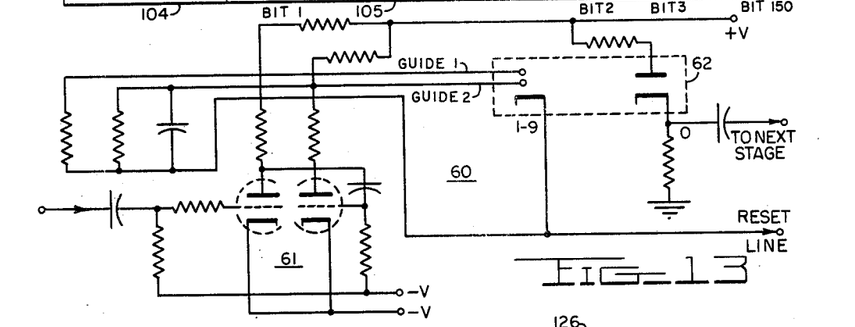
FIG. 13 is a schematic diagram of an integrator counter and its drive circuit.

In the circuit shown in FIG. 13, the integrators 60 comprising a driving circuit 61 and 32 six-place gas-tube decade counters 62, of which only one is shown. This selection was based on size, power consumption and simplicity and not on speed, since the time series under study were of relatively low frequency. The type shown in FIG. 13 is a single ended cold-cathode gas-tube counter. The count is determined by noting the position of the glow on one of the radially spaced cathodes in reference to a bezel engraved 0 to 9. The counter tube has ten reading cathodes plus two guide or transfer cathodes between each of the reading cathodes. It works on the principle that the starting voltage of a gas discharge is lowered if ions and electrons are already present in the anode-cathode region. The glow can be made to move from one cathode to an adjacent one by means of a negative voltage pulse on a new cathode. For example, if the glow is on cathode 1, and guide 1 receives a negative pulse, the glow will transfer to guide 1 adjacent to cathode 1. Then if guide 2 receives a negative pulse, as the pulse decays on guide 1, the glow will transfer to guide 2. At the conclusion of this negative pulse, the guides return to a positive voltage, with the result that a reading cathode, in this case cathode 2, is now more negative than the guides, hence the glow immediately transfers to it. By reversing the sequence of the negative guide pulses, the direction of the glow transfer can be reversed. The zero cathode is brought out separately so that when the glow reaches it, a voltage is obtained which is used to drive the following counter tube through a driver stage 61. In the analyzer shown in FIG. 1, a six-stage counter, with a count capacity of $10^6$ is employed in each of the 32 display channels.

Integrator 63 ($I_0$) connected to the input circuit 53 provides a count of the total number of pulses or marks in the time series under study that have been handled by the analyzer.

Figure 9A:
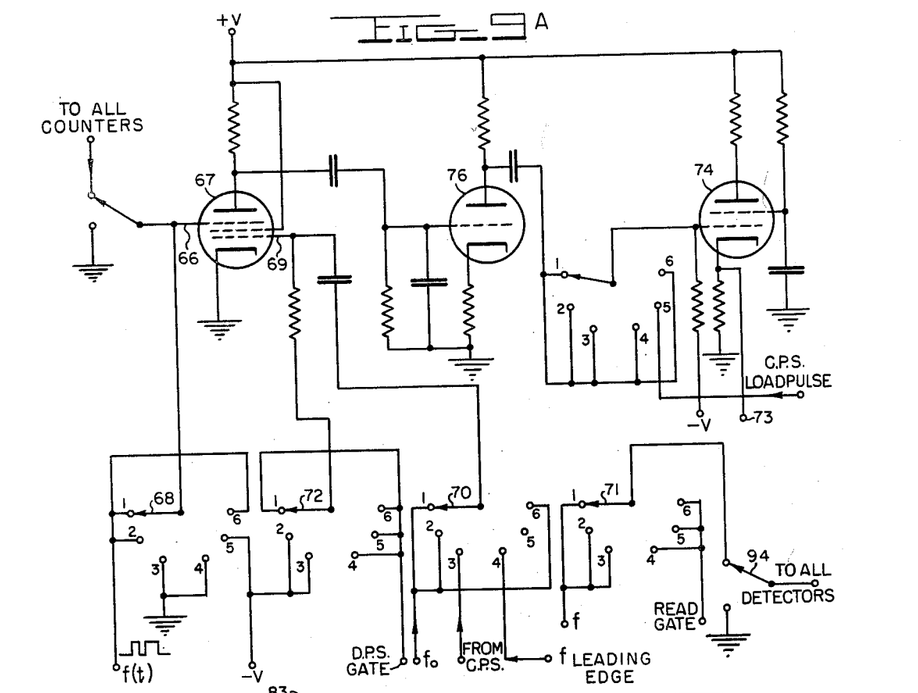
FIG. 9a is a schematic diagram of the program control and loading circuits.
Figure 9B:
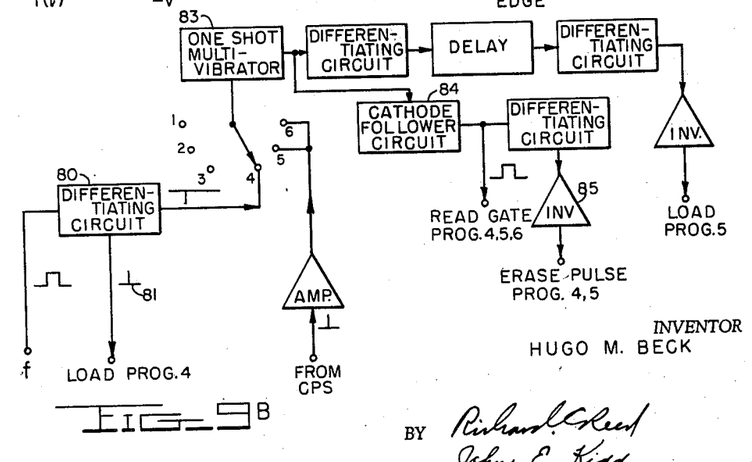
FIG. 9b is a block diagram of the control circuits for programs shown in FIGS. 5 and 6.

From the input circuit 53, the times series $f(t)$, clock rate ($f_0$) and gating pulses are all fed to a program and loading circuit 64 where any one of the above six programs can be selected by a switching arrangement as more fully shown in FIGS. 9a and 9b. The wired-in programs are switched chiefly by six terminal switches. For program 1, the auto-correlation function, information in the form of a square wave is applied to grid 66 of tube 67 through switch contact 68 while the clock rate $f_0$ is applied to grid 69 of the same tube through switch contact 70. A start-stop gate under the control of the dual preset scaler 57 is also applied to grid 69 through switch contact 72. The output 73 from cathode follower 74 loads the shift register 24 with a signal that corresponds to the time series input $f(t)$. The amount of delay provided at a given output (1 to 150) corresponds to the bit position of the signal fed into the shift register. This delayed output information is correlated against the time series $f(t)$ in the coincidence detectors 75.

Since program 2 is similar to program 1 in that the auto-correlation function is observed, the wiring is the same except that the dual preset scaler is not used to gate tube 67. Instead, $f(t)$ is gated by 30 as shown in FIG 3.

For the cross-correlation function, program 3, the output pulse of the cyclic preset scaler 76 (FIG. 1) is substituted for clock rate $f_0$ by moving contact 70 to position 3 in FIG. 9a. Grid 66 of tube 67 is grounded by also moving contact 68 to position 3. This results in a load being fed into the shift register with every cyclical output pulse.

Programs 4 and 5 can best be seen when considering FIG. 9b in conjunction with FIG. 9a. In program 4, the leading and trailing edges of the pulse group interval under study are differentiated by differentiating circuit 80. The leading edge 81 of the pulse group, loads the shift register 24 through tubes 67, 76 and 74 in the usual manner by moving switch contact 70 to position 4. At the same time, the group interval is used to gate on the advance drivers 77 through gates 78 and 79 in the advance driver unit, shown in FIG. 14. On the trailing edge 82 of the pulse group under consideration, the shift register advance ceases, a read pulse is generated by multivibrator 83 and is applied in parallel to all the detectors through cathode follower 84. A read is obtained, however, only from that shift register bit which corresponds to the length of the pulse group interval. This count is fed directly into the corresponding gas-tube integrators. After a slight delay an erase pulse is generated by inverter 85 which clears the shift register in preparation for measuring and recording the duration of the next pulse group interval.

In program 5, the shift register is loaded with a single delayed pulse derived from the cyclic preset scaler 76. The advance drivers 77 are gated on with the marks in time series $f(t)$, which advances the single load down the shift register. On the next cyclic preset scaler pulse, a read pulse is gated into the detectors 75. The gas-tube integrator 60 receives a count only if it is connected to that bit which corresponds to the total time series mark count, received during the cyclical preset scaler interval. After a small delay an erase pulse is generated which clears the shift register, and a new load pulse is then fed into the first bit of the register. The system is now ready to count automatically the number of marks of the time series $f(t)$ during the next cyclic preset scaler interval.

In program 6, the shift register is loaded in the normal manner as in programs 1 and 2. The detectors, however, are gated from the 32 matrix circuits 90, rather than from the 32 bits of the shift receiver 24 itself. The gas-tube integrators are told when to read by a read pulse to the detectors derived from the cyclic preset scaler 76.

Two checks are built into the program and loading circuit 64, one, a counter check switch contact 92, grounds grid 66 of tube 67. This results in a constant clock rate $f_0$ being loaded into the shift register 24. Since the advance is not gated for this test, all integrator counters 60 should read the same number of counts in a given time interval determined by the dual preset scaler 57. The second test, the detector check, switch contact 94 (FIG. 9a), grounds a common input for all the detectors. The integrator counters 60, therefore, will record the number of pulses or marks in time series $f(t)$, in a given dual preset scaler time interval. Since the advance is not gated, all the integrator counters should read the same.

It should be appreciated that other checks and cross checks are also available by proper setup and by interpretation of output readings.

Figure 10:
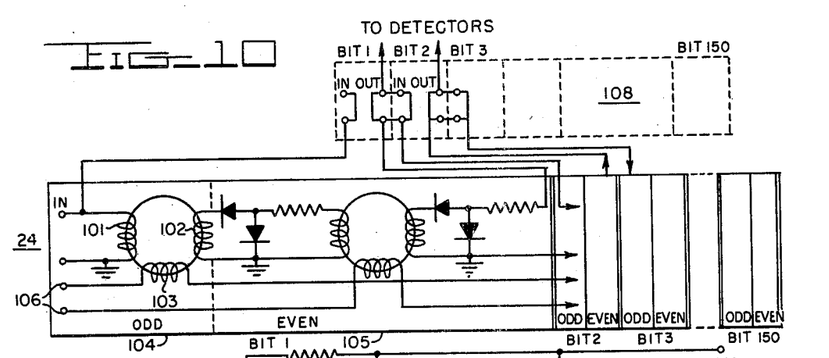
FIG. 10 is a partially schematic and partially block diagram of the shift register bit and plug board.

Basic to the statistical enalyzer 20 is a shift register 24 shown as a magnetic two-core-per-bit shift register in FIG. 10 of 150 bit length. The core is made of a magnetic material that has a nearly rectangular hysteresis loop, which gives it the property of having two stable states, "0" and "1". Each core has three windings: an input winding 101, an output winding 102, and an advance winding 103, and each bit has two cores, an odd core 104 and an even core 105. When a core receives an advance from driver 77 at terminals 106, a magnetizing current flows in such a direction as to cause those cores in the "1" state to change to "0." Those cores already in the "0" state remain in the "0" state. When a core is switched from the "1" to "0" state by the advance 77, it generates a voltage into the output winding which is coupled to the input winding of the following core and causes the core to switch to the "1" state. In this manner information is shifted down the shift register.

The output and input windings of each bit of the shift register 24 are connected to the plugboard 108. The 32 detectors 75 can be plugged into any 32 bits in the shift register. This method of connection also makes it possible to form from the shift register any number of independent ring loops of any desired length.

Figure 12:
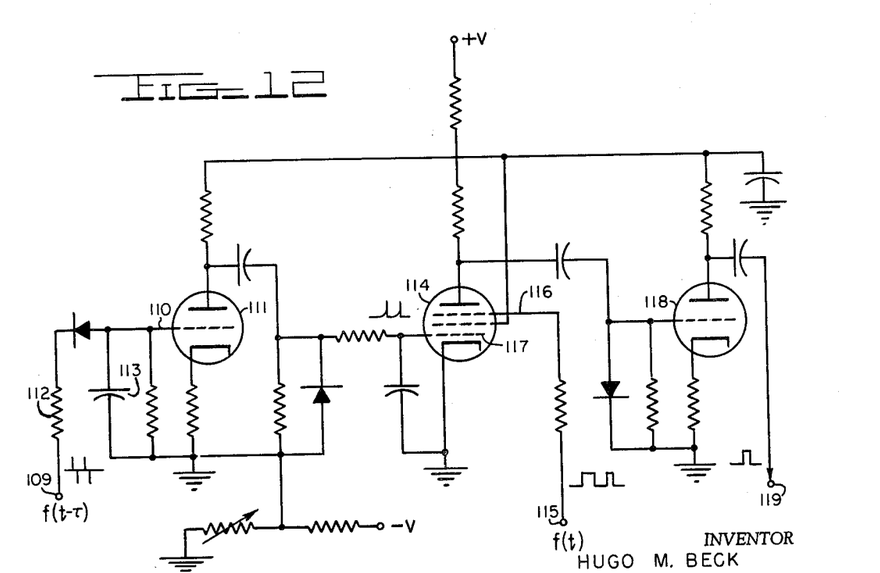
FIG. 12 is a schematic diagram of the detector circuits.

The circuit for a coincidence detector channel is shown in FIG. 12. The information from the shift register 24, $f(t+\tau)$, is fed through plugboard 108 to input terminal 109 which impresses the signal on grid 110 of tube 111. Here the signal is integrated by resistor 112 and capacitor 113, to reduce the effect of any spurious transient pulses from shift register 24. Impedances in this stage are low in order to reduce noise pickup and to prevent crosstalk between the respective detectors. In tube 114, time series $f(t)$ impressed on terminal 115 is compared for coincidence on grid 116 with $f(t+\tau)$ on grid 117. If a coincidence occurs, an output pulse is developed which is inverted and shaped in tube 118 and coupled directly to the first driver stage 61 of a gas-tube integrator counter. A typical output pulse from the detectors is a positive rectangular pulse shown at coupling terminal 119. It should be appreciated that in accordance with the program chosen, other signals could be applied to input terminal 115.

Figure 11:
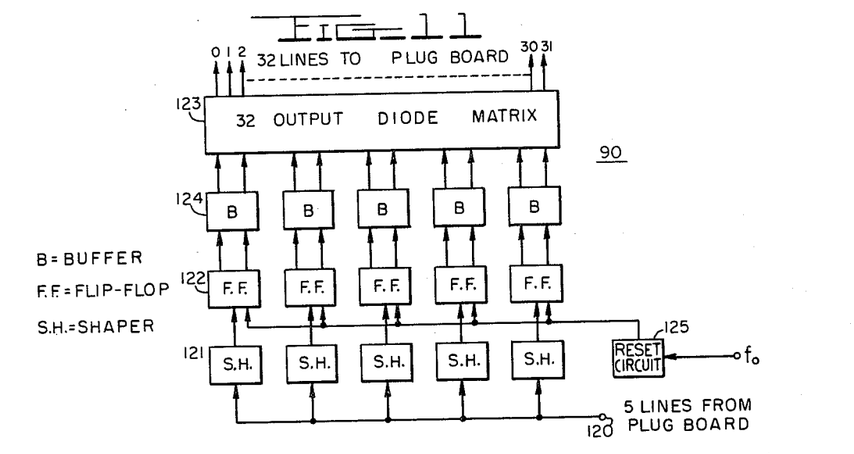
FIG. 11 is a diagram of the matrix circuit showing the respective elements in block form.

To provide program 6 with a translating circuit 90, a diode matrix circuit as shown in FIG. 11 is employed. Here a 32-level diode matrix and switching circuit is shown in block form. Five inputs from the shift register are fed to terminal 120 by way of plugboard 108. Each of these inputs is shaped by a shaping circuit 121 and control a flip-flop 122, which in turn sets up the diode matrix 123 through a group of buffer stages 124. The matrix is essentially a network of diode AND gates, so arranged that each combination of states of the flip-flops yields a ground voltage on only one of the 32 output lines. All the other lines are biased negatively. A read pulse may be obtained from the line when the line is returned to the negative state by resetting the flip-flop through a reset circuit 125 as shown in FIG. 11a. Clock rate $f_0$ is used to trigger the reset circuit although other signals could be employed.

Figure 14:
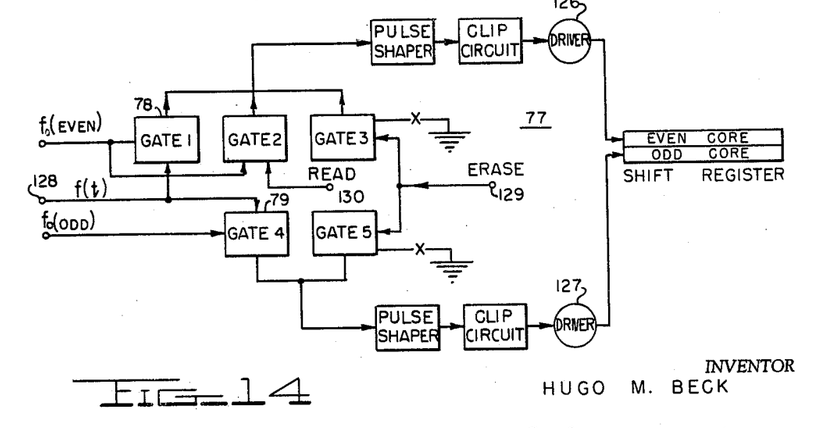
FIG. 14 is a block diagram of an advance driver for the shift register circuit.

The advance driver circuit 77 for driving the magnetic core units of the shift register 24 is shown more fully in FIG. 14. Two pulses $f_0$ (even) and $f_0$ (odd) generated in the input circuit 53 are used for triggering the driver. The pulses feed a network of gates, such as gates 78 and 79 which in turn generate pulses of the proper amplitude, width and rise times. The drivers 126 and 127 are power pentodes capable of delivering large current pulses for the even and odd core advance windings 103.

In programs 1, 2, 3 and 6 all the gates are gated on. In programs 4 and 5, the advance is gated on in gates 1 and 4 with the $f(t)$ marks impressed on gate terminal 128. At the proper time, an erase pulse is applied to terminal 129 and fed simultaneously to both lines through gates 3 and 5, and erases all the information in the shift register 24. Gate 2 is used for gating on the even advance, for obtaining a signal from the proper register bit, when the read terminal 130 is triggered for programs 4 and 5, It should be further understood that programs 4 and 5 may also be instrumental without the use of delay lines, by use of a five bit binary scaler, with parallel five bit output to the matrix, as utilized in program 6.

It should be pointed out that other devices are suitable for the display integrators and that it is also possible to provide a normalized display, such as an instantaneous plotting board which can present at cinematic speeds, short-time probability estimates produced by the statistical analyzer.

In conclusion, it is noted that six statistical programs have been instrumented in a single analyzer which is capable of providing useful information with a high degree of reliability in real time.

Obviously many modifications and variations of the analyzer are possible in the light of the above teachings. It is therefore to be understood, that within the scope of the appended claims, the invention may be practiced otherwise than as specifically described.

What is claimed is:

1. A data processing system for statistically analyzing a binary series of information in real time with respect to a clock pulse comprising:

input means responsive to said binary information and clock pulse for shaping and synchronizing said clock pulse with said binary information, program means for performing a plurality of statistical programs and operating on said binary information for a given time interval, means for selectively connecting said program means to the output of said shaping and synchronizing means, said connecting means having a plurality of connections whereby each connection corresponds to a specific program, means operative to define in said program means a sample size for each of said statistical programs in accordance with predetermined time intervals.

means receiving the output of said program means for providing a delay of the binary series being analyzed and appearing in the output of said program means, said delay means having a plurality of output channels, each output channel corresponding to the bit position of the signal received by said delay means, said delay means producing output pulses on the output channels, each output pulse being the delayed version of the input binary series of information, the delay of each pulse corresponding to the respective bit position at which the output pulse is produced, means for advancing said binary series along said delay means, coincidence detector means connected to receive said output pulses in parallel and for producing a pulse whenever coincidence occurs between said binary information and any delayed version thereof, and means operable to display the pulses produced by said detector means.

2. The data processing system of claim 1 wherein the output of said coincidence detector means is received to be displayed on an integrator-counter means, said integrator-counter means having a plurality of channels corresponding to the channels at the output of the delay means, for indicating in each of said integrator-counter channels a value corresponding to the number of coincidences detected in a particular channel, whereby the values of the plurality of channels displayed together represent a statistical distribution.

3. A data processing system as recited in claim 2, further including means for providing cross-checks in said program means for each program selected.

4. A data processing system as recited in claim 3, further including means for counting the total number of pulses of binary series of information that have occurred in the sampling period.

5. A data processing system as recited in claim 4, further including means for defining additional sampling parameters in said program means.

References Cited in the file of this patent

UNITED STATES PATENTS 2,947,971     Glauberman             Aug. 2, 1960